Aug. 13, 1935.　　　W. F. HEINEMAN　　　2,010,954
WELDING MACHINE
Filed April 30, 1934　　　3 Sheets-Sheet 1

INVENTOR.
Warren F. Heineman
BY
ATTORNEY.

Aug. 13, 1935.  W. F. HEINEMAN  2,010,954
WELDING MACHINE
Filed April 30, 1934  3 Sheets-Sheet 2
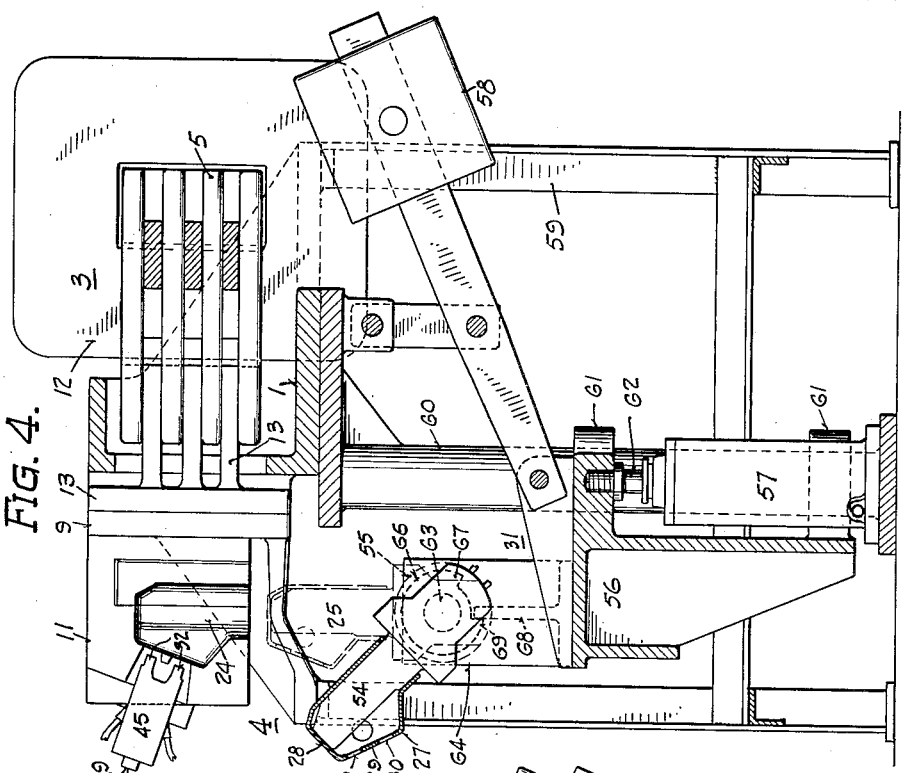
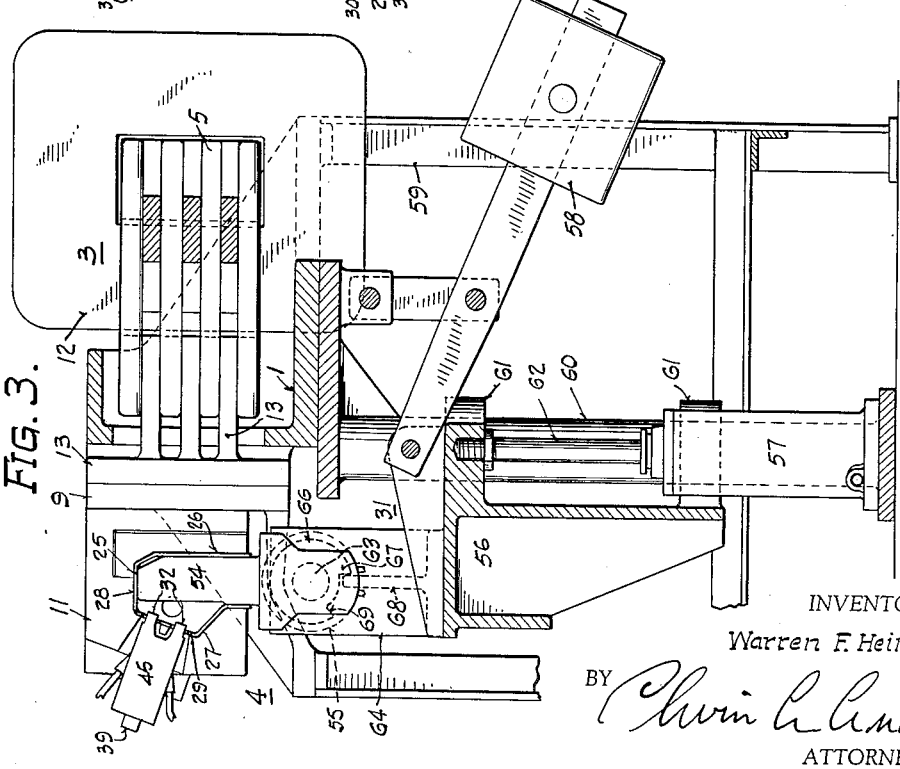
INVENTOR.
Warren F. Heineman
BY
ATTORNEY.

Aug. 13, 1935. W. F. HEINEMAN 2,010,954
WELDING MACHINE
Filed April 30, 1934    3 Sheets-Sheet 3

INVENTOR.
Warren F. Heineman
BY
ATTORNEY.

Patented Aug. 13, 1935

2,010,954

UNITED STATES PATENT OFFICE 2,010,954

WELDING MACHINE

Warren F. Heineman, Shorewood, Wis., assignor to A. O. Smith Corporation, Milwaukee, Wis., a corporation of New York Application April 30, 1934, Serial No. 723,024

8 Claims. (Cl. 219—4)

This invention relates to a novel and improved welding machine.

An object of the invention is to provide an efficient and simple machine for the flash resistance welding together of segments to form hollow articles.

Another object of the invention is to provide efficient means for clamping and holding work parts of irregular shape in work-fitting recesses of the electrode dies of a resistance or flash resistance welding machine while uniting such parts by flash welding to form a hollow article.

Another object is to provide such clamping means whereby the irregular work pieces may be effectively held in electrode recesses during the heating portion of the flash welding operation, by which they are being joined to form a hollow article, against warpage tending to cause portions of said pieces to be separated from contact with said recesses.

Other objects of the invention will become apparent by referring to the accompanying description and the annexed drawings in which an embodiment of the invention is illustrated.

Fig. 3 is a vertical section of the machine taken on line 3—3 of Fig. 1, the work-clamping means being positioned for welding;

Fig. 4 is a similar section to that of Fig. 3, with the work-clamping means in position for the removal from the machine of the welded article;

Figure 1:
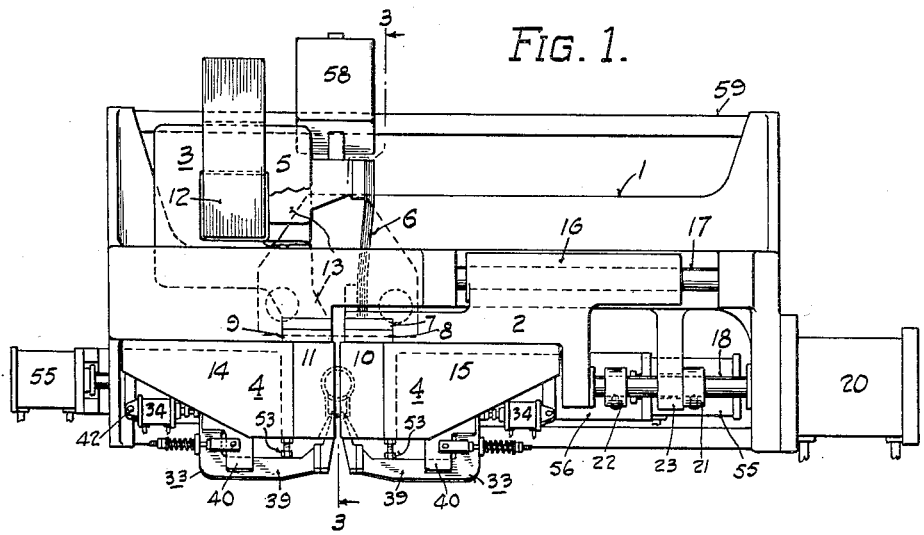
Figure 1 is a plan view of a machine constructed according to the invention.

Referring first to Fig. 1, the machine as there illustrated comprises a main stationary supporting structure 1, a movable supporting structure 2, a welding current supply unit 3, and a pair of horizontally-moving, work-clamping mechanisms 4 which are shown as indirectly supported upon the stationary and movable supporting structures 1 and 2, respectively.

The welding current supply unit 3 comprises a welding transformer 5, supported on the stationary structure 1, flexible leads 6, terminal block 7, conducting spacers 8 and 9 and electrode dies 10 and 11.

The transformer 5 comprises a set of primary coils, a magnetic core 12, and secondary conductor casting 13. One terminal of secondary 13 is arranged to conduct current to the stationary electrode 11 by being bolted to the same through conducting block 9. The other terminal of secondary 13 is arranged to conduct current to the movable electrode 10 by means of flexible leads 6 which are bolted to said terminal of secondary 13 and also to terminal block 7 which in turn carries the current into electrode 10 by being bolted to the same through conducting block 8.

The stationary electrode die 11 is supported by bracket 14 which in turn is bolted to the main stationary structure 1. Movable electrode 10 is supported upon bracket 15 which in turn is supported by movable structure 2.

The structure 2 is provided with horizontally-bored slides 16, within which slide bars 17, which are fixed to support 1, are arranged. Structure 2 and movable electrode 10 are arranged to move toward and away from stationary electrode 11 by means of a connecting rod 18 and double-acting piston 19 which piston travels in hydraulic pressure cylinder 20. Adjustable stops 21 and 22 for the forward and reverse strokes, respectively, are clamped to connecting rod 18 which passes through stationary stop 23 attached to support 1. Stops 21 and 22 contact with stop 23 to limit the travel of electrode 10.

Figure 5:
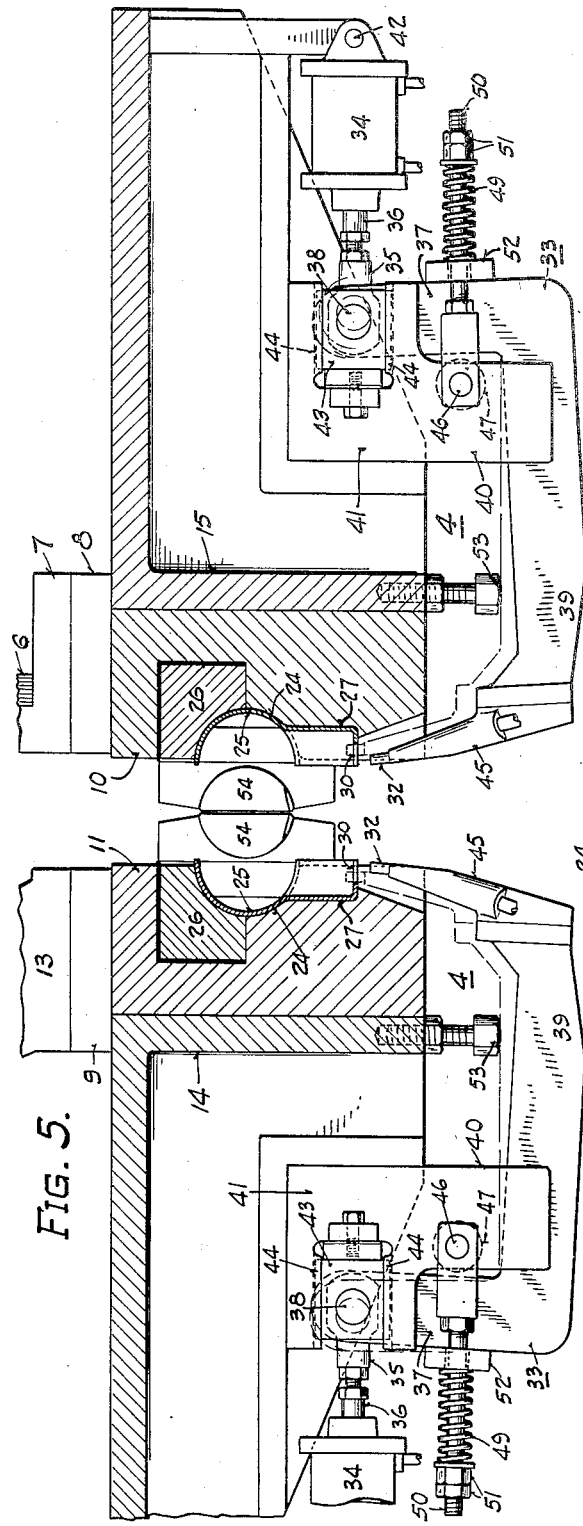
Fig. 5 is a view taken looking downwardly of a pair of work-clamping mechanisms in open position. This view is taken on line 5—5 of Fig. 2 and shows a portion of the electrode-supporting structure in section.

Electrodes 10 and 11 have recessed openings 24 in their meeting faces which are shaped to contact the outer faces of work pieces 25 of which small edges only project beyond the surfaces of the electrodes to be burned away by the flashing arc during the heating period and finally to be pressed together to form a weld bonding the pieces together to form the completed tubular article. Work pieces 25 are shown additionally in Figs. 2, 3, 4, 5, and 6. In Fig. 5 they are shown as first placed in the separated electrode recesses before the clamping and welding operations have been performed.

The work pieces 25, upon which the particular embodiment of the invention illustrated in the drawings is shown to be operating, are of irregular, cupped shape, having in the completed article a substantially cylindrical portion 26 with a substantially rectangularly shaped box section 27 as a protuberance on the side thereof and arranged at an inclined angle to its axis. In the particular case illustrated, the two work pieces are of opposed complementary shape and constitute half parts of the finished article. One end of the article is substantially closed by an end wall 28. The side wall 29 of the protuberance has two openings 30 extending through the mid-portion thereof.

Considerable difficulty is experienced in the flash welding of such irregular hollow bodies as those of which work pieces 25 are an illustration. This is due to the fact that during the period of heating the edges by the flashing arc, these heated edges become elongated and tend to warp the work pieces. This warping tends to occur since while heating with the flashing arc no pressure can be exerted between the edges being heated to hold the respective work pieces in proper contact with their respective electrode recesses. If such warping of the work pieces actually takes place, thereby causing portions of the work pieces to be separated from their recesses, the final operation of pressing the edges together to form the weld will result in an imperfect weld. Those parts of the article which are then not in contact with the recesses will have had their adjacent edges burned away excessively and will therefore not receive the proper welding pressure in the welding operation.

The present invention obviates the above difficulty by providing a system of clamping mechanisms which insures that the work pieces shall remain in perfect contact with the bottoms of their respective electrode recesses at all times during the flash heating period.

Figure 2:
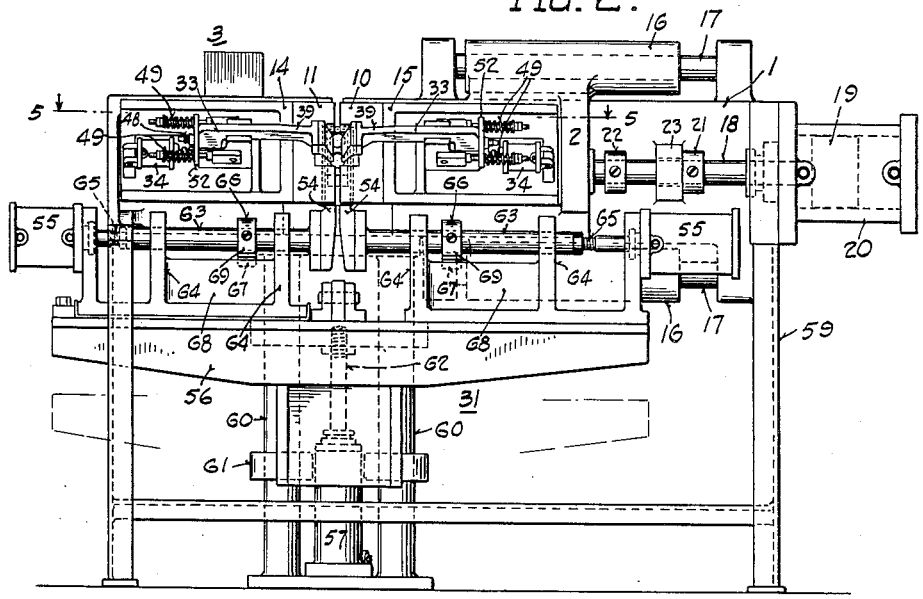
Fig. 2 is a front elevational view of the machine shown in Fig. 1.

In the present illustration, there are provided two types of clamping mechanisms for the work pieces one of which is the previously mentioned pair of clamping mechanisms 4. The other clamping mechanism 31 is best shown in Fig. 2, but is also illustrated partly in section and partly in elevation in Figs. 3 and 4.

Figure 6:
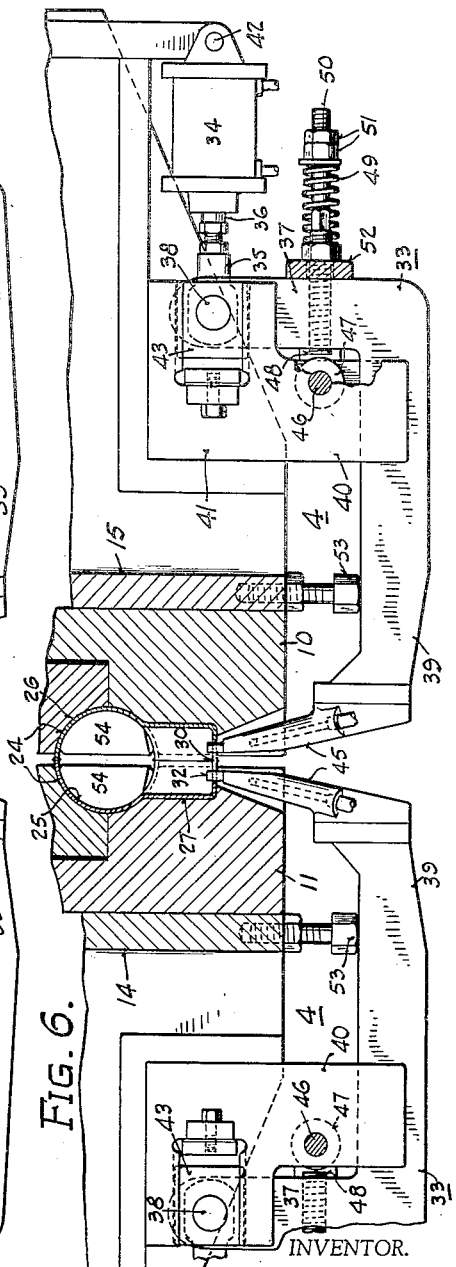
Fig. 6 is a view similar to that of Fig. 5 with the work-clamping mechanism in clamping relation to the article being welded.

Fig. 5 and 6 show, in larger scale, clamping mechanisms 4. Fig. 5 shows these mechanisms in open or retracted position at the time the operator sets the two work pieces in the electrode recesses and before the clamping of said pieces in said recesses. Fig. 6 shows the mechanisms in clamping relation to the work pieces.

Referring to Fig. 5, one of the pair of clamping mechanisms 4, which are alike, comprises generally a pair of work-engaging fingers 32 (best shown in Figs. 3 and 4), finger supporting member 33, and actuating air cylinder 34.

The double-acting piston of air cylinder 34 is attached to yoke 35 by means of the adjustable connecting rod 36. Yoke 35 is pivotally connected to arm 37 of supporting member 33 by means of pin 38. Member 33 has a long arm 39 guided against vertical displacement by plates 40 (best shown in Figs. 2 and 6) which are a part of the support bracket 41. Bracket 41 in the case of the right-hand clamping mechanism 4 is rigidly attached to bracket 15 and thereby is arranged to move with the electrode moving structure 2. In the case of the left-hand clamping mechanism 4 the bracket 41 is attached to stationary bracket 14. Similarly, the outside ends of the operating cylinders 34 are pivotally connected to the movable and stationary structures by means of pins 42.

The short arm 37 of member 33 is guided and restrained against vertical and lateral displacement by cross head 43 sliding in ways 44.

Arm 39 has a water-cooled extension 45, upon the end of which are located the fingers 32 which are arranged to engage the work pieces 25 through openings 30.

Finger supporting member 33 is arranged to pivot about pin 46 by means of roller 47 which permits a slight lateral displacement of member 33 at the position of this pivot. The position of member 33 with respect to its pivot 46 is adjustable by means of screw 48. Provision is additionally made for member 33 to move outwardly from its pivot in the direction of the motion of the operating piston by means of a pair of compression springs 49 (best shown in Fig. 2) mounted on tension rods 50 which are pivoted also on crank pin 46. The springs are adjustably restrained on rods 50 by means of nuts 51 and bear upon member 33 through block 52. When member 33 moves as thus provided, its arm 39 is arranged to slide along adjustable stop 53 which also acts as a stop for the inward pivotal movement of member 33.

The clamping mechanism 31 comprises in general work-engaging arms 54, operating pneumatic cylinders 55, a supporting beam 56, an elevating pneumatic cylinder 57 and a counterbalance 58.

As best shown in Figs. 3 and 4, the necessary room for the operation of the clamping mechanism 31 is obtained by the elevation of the main supporting structure 1 on a base illustrated as frame 59.

The supporting beam 56 of clamping mechanism 31 is guided vertically by posts 60 and guide members 61. Piston rod 62 of the single-acting pneumatic cylinder 57 engages beam 56 to effect the raising of the clamping arms 54 into the cylindrical portion of work pieces 25.

Clamping arms 54 are shaped to conform to the contour of the inside of the cylindrical portions of the pieces and are arranged to bear upon the full length of these parts to effectively confine them to the corresponding walls of the electrode recesses 24 during the heating period.

The arms 54 are mounted on the ends of the horizontally movable shafts 63 which are free to slide and rotate in bearing blocks 64 mounted on beam 56. Shafts 63 are connected to the pistons of pneumatic cylinders 55 by adjustable connectors 65. The cylinder 55 toward the stationary end of the welding machine is arranged for the double action of its enclosed piston. The cylinder 55 toward the movable end of the machine is single acting, and functions only in the direction necessary to clamp the work piece to the electrode.

Shafts 63 are provided with stop collars 66 which act to limit their rotational movement. When the operator has pushed work-engaging arms 54 into the vertical position, shoulder 67 engages web member 68 and insures the location of these arms in said vertical position. After the weld has been completed, the clamps released, and the electrodes separated, air pressure is applied to the outer end of the left-hand cylinder 55, thereby pushing both of the clamping arms 54 away from the stationary electrode, carrying the welded article with them, since these arms are still within the article. This movement is limited by the left-hand stop collar 66 contacting bearing block 64 to its right. The air pressure in elevating cylinder 57 is then released allowing clamping arms 54 and the article to drop below the electrodes, after which the operator pulls the arms forward to the inclined position shown in Fig. 4. This rotational movement is limited by shoulders 69 on collars 66 engaging web 68. In this position the operator removes the article 25 from arms 54 and then pushes said arms into their vertical position for the start of another clamping and welding operation.

The beginning of this cycle of operation is as follows: The operator places work pieces 25 in the electrode recesses while in their open position as in Fig. 5; arms 54 are raised into place by elevating cylinder 57; pressure is then applied to cylinders 55, thereby causing arms 54 to clamp the article into the electrode recesses 24. The right-hand clamping arm remains in contact with its work piece during the later forward movement of the movable electrode since the piston of cylinder 55 is drawn forward by this movement, the air pressure in such cylinder being maintained to continue to exert clamping pressure on its respective work piece.

Air pressure is also applied at this stage to cylinders 34 to move fingers 32 into clamping engagement with the protuberance 27 of article 25. The first movement is a pivotal motion of arm 39 about pivot 38 which moves fingers 32 through openings 30. This movement is limited by stop 53. The continued application of pressure to cylinders 34 further moves member 33 and fingers 32 outwardly by compressing springs 49, arms 39 sliding along stop 53, until fingers 32 are in clamping engagement with the protuberances 27. This clamping engagement remains the same during the travel of the movable electrode. The later unclamping of mechanisms 4 is the reverse of the operations just described. Pressure in that case is applied in the cylinders 34 in the opposite direction.

After the clamping is accomplished as above described, or during such operation, hydraulic actuation of the piston 19 of main cylinder 20 occurs in the forward direction until heating and welding engagement of the parts results. After the heating is completed, the movable electrode is quickly moved forward to press and weld the parts together, after which the pressure on the clamps is released, the movable electrode retracted, and the piece removed as before described.

The operations of clamping and welding of the irregular article 25 as above described result in an efficient weld and a finished article of great excellence.

Various modifications may be made in detail by those skilled in the art without departing from the invention as defined in the claims.

What I claim is:

1. In a flash welding machine, clamping means for a part of an article to be formed by welding, comprising work-engaging means and pivoted means to first swing the work-engaging means into adjacent position to such work part and additional means to move said pivoted means away from its pivot and to continue the movement of said first named means in a different direction to clamp said piece in the machine.

2. In a flash welding machine with welding electrodes arranged to flash weld abutting edges of parts of a tubular article, clamping means for said parts comprising members which are arranged to extend within the article to clamp the same against the electrodes, means to clamp said members against the parts to be welded during the heating period, and means to move said members and article laterally away from the electrode position after the weld is completed.

3. In a flash welding machine with welding electrodes arranged to flash weld abutting edges of parts of a tubular article, clamping means for said parts comprising members which are arranged to extend within the article to clamp the same, means to clamp said members against the parts to be welded during the heating period, and means to move said members and article laterally away from the electrode position and tilt said members in a direction to permit the removal of said article from the machine.

4. A welding machine for the flash resistance welding of an article comprising a source of current, a pair of electrodes arranged to move relative to each other, having recesses in their meeting faces arranged to receive and closely fit the outer surfaces of two parts, respectively, of an irregular hollow article having a main substantially tubular section and a protuberance projecting laterally therefrom, clamping means arranged to enter said tubular part and closely confine the surface of such part to the corresponding recesses of said electrodes and additionally arranged to move laterally away from the position of said electrodes and carry the completed article therewith to a position accessible for removal, additional clamping means arranged to contact the parts of said protuberance to hold the same in the said recesses during the heating operation, said last named means being arranged for removal from the position of said article before the lateral movement of said first named clamping means and means to press the parts together and weld the same into a hollow article.

5. In a flash welding machine with welding electrodes arranged to flash weld abutting edges of parts of a tubular article, clamping means for said parts comprising members which are arranged to extend within the article to clamp the same, means to clamp said members against the parts to be welded during the heating period, and counter-balanced means to move said members, member clamping means and article laterally away from the electrode position to permit the removal of said article from the machine.

6. A flash welding machine with welding electrodes arranged to heat and flash weld abutting edges of a tubular article comprising in part means to move said electrodes relatively toward and away from each other, means separate from but movable with said electrode moving means to clamp said article to one of said electrodes during the heating operation and additional means attached to said electrode moving means to further hold said article in contact with said electrode during the heating operation.

7. A flash welding machine with welding electrodes arranged to heat and flash weld abutting edges of a tubular article comprising in part means to move said electrodes relatively toward and away from each other, means separate from but movable with said electrode moving means to clamp said article to one of said electrodes during the heating operation, additional means attached to said electrode moving means to further hold said article in contact with said electrode during the heating operation, and means to move said first named clamping means and said article laterally away from said electrode upon completion of the welding to permit the removal of the article from the machine.

8. In a flash welding machine with electrodes arranged to flash weld abutting edges of parts of a tubular article, clamping means comprising clamping members, levers supporting said members and arranged to pivotally move laterally to the direction of welding movement of said electrodes and means to move said levers additionally longitudinally of the direction of said electrode movement to clamp said article to said electrode.

WARREN F. HEINEMAN.